United States Patent [19]

Nyssen et al.

[11] Patent Number: 5,125,942
[45] Date of Patent: Jun. 30, 1992

[54] PROCESS FOR THE PRODUCTION OF MINERAL WOOL FIBRES OF LOW SHOT CONTENT

[75] Inventors: Peter R. Nyssen, Dormagen; Dirk Berkenhaus, Cologne; Ewald Strzelczyk, Dormagen; Hans-Theo van Pey, Lipp, all of Fed. Rep. of Germany

[73] Assignee: Bayer Aktiengesellschaft, Fed. Rep. of Germany

[21] Appl. No.: 677,624

[22] Filed: Mar. 28, 1991

[30] Foreign Application Priority Data

Apr. 12, 1990 [DE] Fed. Rep. of Germany ....... 4011884

[51] Int. Cl.$^5$ .............................................. C03B 37/06
[52] U.S. Cl. .......................................... 65/5; 65/10; 65/16
[58] Field of Search ............................. 65/2, 5, 10, 16

[56] References Cited

U.S. PATENT DOCUMENTS

| | | | |
|---|---|---|---|
| 2,255,227 | 9/1941 | Parsons | 65/10 |
| 2,316,451 | 4/1943 | Page | 65/10 X |
| 3,357,808 | 12/1967 | Eberle | 65/10 X |
| 4,487,622 | 12/1984 | Battigelli et al. | 65/5 X |
| 4,533,376 | 8/1985 | Muschelkrautz et al. | 65/5 |
| 4,553,996 | 11/1985 | Muschelknautz et al. | 65/5 X |
| 4,961,695 | 10/1990 | Hirschmann et al. | 65/5 X |

Primary Examiner—Robert L. Lindsay
Attorney, Agent, or Firm—Connolly & Hutz

[57] ABSTRACT

The process for the production of mineral wool fibres is based on melt streams 1 issuing from a melt distributor 3 being reduced to fibres in a drawing nozzle 9 by a blast medium flowing with high velocity in the axial direction. The blast medium charged with fibres then arrives in a subsonic diffuser 11 in order to reduce the flow velocity. The fibre-charged stream 10 is subsequently led onwards in a rectangular shaft 13. To separate non-fibrous constituents (so-called shots), a plurality of gas jets 18 are blown in at the shaft end transversely to the main flow direction at an angle $\alpha$ of 30° to 120°. As a result the fibre-charged stream is deviated. The stream 22 deviated in a direction of $\beta = 60$° to 140° is then picked up by a fibre shaft 21 mounted at the same angle $\beta$ and led to a deposition belt 23. The non-fibrous constituents (shots) 19, on the other hand, owing to their lower air resistance and higher inertia, fall through between the gas jets 18 and reach the lower discharge shaft 20.

8 Claims, 3 Drawing Sheets

PROCESS FOR THE PRODUCTION OF MINERAL WOOL FIBRES OF LOW SHOT CONTENT

The invention relates to a process for the production of mineral wool fibres, especially glass fibres and diabase fibres with a diameter of 0.1 μm to 10 μm, preferably 0.1 to 6 μm, by the blast drawing process, in which melt streams issue from melt discharge openings in the bottom of a melt distributor and are reduced to fibres in a drawing nozzle coupled downstream by a blast medium flowing essentially parallel to the melt streams, the blast medium being drawn in by a pressure drop in the drawing nozzle and the flow velocity being reduced in a diffuser coupled downstream. Such a process is described e.g. in EP-A 38 989 and EP-A 200 071.

During the production of mineral fibres by the blast drawing process, not only are fibres formed but also non-fibrous constituents, so-called fibre undrafted parts, such as e.g. beads, nibs, knots. Such undrafted parts are also known as "shots". Particularly with the use of melts of low viscosity, such as e.g. diabase, the non-fibrous components can constitute a high percentage of the product and impair the application properties of the products.

Thus for example the thermal conductivity of the mats or slabs produced from the mineral fibres is impaired. Also the nonfibrous constituents increase the density of the products unnecessarily. Normally a higher density is accepted only if as a result the physical properties such as strength and thermal conductivity can be improved. Sometimes through the incorporation of undrafted parts or shots special mechanical properties such as the recovery after compression or tear strength of a product are distinctly impaired.

In using the fibres for filtration purposes, e.g. in the form of filter papers, the non-fibrous constituents impair the filtering properties; that is the separating capacity deteriorates. The reduction of the non-fibrous constituents is therefore of great technical and economic interest.

This is where the invention starts. The basic problem is to obtain in a blast drawing process a separation of the non-fibrous constituents (shots) following the gas-dynamical reduction to fibres in the blast nozzle.

In the technology of separation of dust particles from gas streams, the methods of counterflow and crossflow sifting are known. In this case the problem is to separate the solid almost completely from the gas stream, the solid being present in general in the form of particles with a more or less broad particle size distribution.

For various reasons these known techniques are not applicable for shot separation in connection with the blast drawing process:

1. The charge of the gas stream consists in the present case of particles of different geometrical shape, namely the fibres fraction and the shots fraction.

2. Separation of the fibres in an intermediate stage cannot be considered for separation of the non-fibrous constituents (shots), since the fibres must be separated from the gas stream only when forming the mat.

3. Furthermore shot separation is only possible at high flow velocities of the gas stream in order to utilize for optimum separation the difference in inertia of the particles.

The solution to the problem according to the invention thus starts out from a blast drawing process, in which the charge of the blast medium used for reducing to fibres consists of the desired fibres and the undesirable shots. The total charge level depends essentially on the product quality desired. The percentage of shots in the charge, depending on the quality, is 1 to 40%, preferably 10 to 25%. To be considered as shots in particular are undrafted parts >10 μm. However, with very fine fibres (d<5 μm), even shots>5 μm have a disturbing effect. With the invention shots greater than 20 μm, in particular, should be separated. This shot fraction has proved to constitute more than 80 weight % of all shots.

This problem, starting from the process described at the outset, is solved according to the invention by leading on the stream charged with fibres and shots after retardation in the diffuser into a shaft with rectangular cross-section, to the end of which, transversely to the main flow direction, a plurality of gas jets are blown in at an angle $\alpha$ of 15° to 110°, preferably 30° to 90°. The momentum of these gas jets causes a complete deviation of the fibre-charged stream by an angle $\beta$ of 60° to 140°, preferably 90° to 120°. This stream is then picked up by a fibre shaft mounted laterally at the same angle $\beta$ and led to a fibre deposition belt.

The gas jets are suitably produced by a row of boreholes arranged linearly in a gas pressure chamber. From these boreholes the gas jets issue with sonic velocity. Preferably the distance between the gas jets at the boreholes is at least 5 mm, and especially more than 10 mm. Furthermore, an embodiment has proved very successful in which the stream is accelerated by a cross-sectional contraction of the shaft up to the entrance of the transversely directed gas jets (transverse blast) from 20 m/s to 80 m/s at the shaft inlet to 30 m/s to 100 m/s. With this process variant particularly good separation results are achieved if the acceleration of the stream is carried out by a cross-sectional contraction in the form of a shaft wall curved towards the axis, the ratio of the shaft inlet cross-sectional area to the outlet cross-sectional area directly before the transverse blast being 1:1 to 2:1. Owing to the acceleration in the cross-sectional contraction along the curved side wall, an enrichment in shots takes place in the neighbourhood of the curved side wall as a result of the different inertial forces acting on the particles. At the end of the shaft at the point of narrowest cross-section, the gas jets, in a grating arrangement, enter the main stream. Owing to the transverse blast with sonic velocity, the stream is deviated into the lateral fibre shaft. The separation of the undesirable shots now occurs according to the invention as they, on account of their high inertia, fall through between the gas jets issuing from the boreholes while the fibres, owing to their length and their high flow resistance, remain in the gas stream and are consequently deviated into the fibre shaft. Depending on the magnitude of the momentum of the gas jets, even shots which fall directly in the area of the gas jets can also be separated.

The shot separation process according to the invention can be carried out successfully at a total charge of the blast air flow of $4\times10^{-3}$ to $1\times10^{-1}$ kg/kg gas, preferably $7\times10^{-3}$ to $4\times10^{-2}$ kg/kg gas. As a rule up to 80% of the shots>20 μm can be eliminated. The efficiency of the separation depends on the momentum and areal coverage of the gas jets, the angle of incidence $\alpha$ and the deviation of the charged stream $\beta$, as well as the distance apart of the gas jets, and can be relatively easily optimized as a function of the operating condition of the drawing nozzle.

An embodiment is explained in more detail in the following with the aid of drawings.

Figure 1:
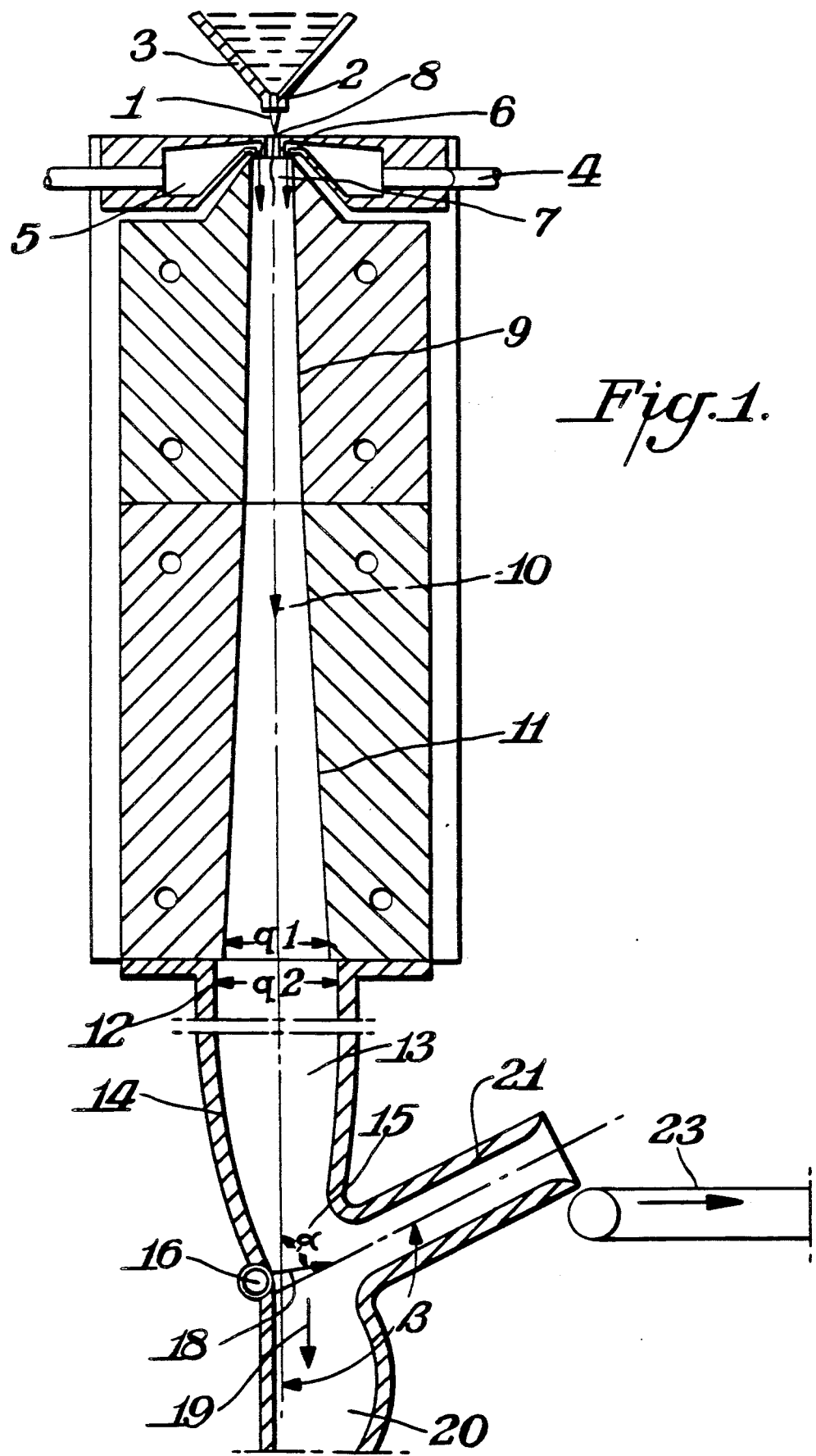
FIG. 1 shows a drawing nozzle with a shot separating device coupled downstream.

According to FIG. 1 the glass-melt stream 1 for reduction to fibres issues from the nipple 2 of the melt crucible 3. The driving gas jets 7 generated via supply lines 4, pressure chambers 5 and boreholes 6 produce a strong pressure drop at the inlet 8 of the drawing nozzle 9, so that ambient air is drawn in to the drawing nozzle inlet 8 and this ambient air together with the driving streams 7 flows as blast medium with high velocity through the drawing nozzle 9. In the course of this, the melt stream is separated into a large number of individual fibres by the pressure drop in the drawing nozzle inlet. As already mentioned, it is unavoidable that in the fibre forming process a certain proportion of fibre undrafted parts (shots) are produced, such as e.g. beads, knots, accumulations or local fibre accumulations. This mixture of blast medium, fibres and shots is below called "solids-charged gas stream" 10. The technical details of a drawing nozzle and the physical processes responsible for the fibre forming process are described in detail in EP 0 200 071.

At the end of the drawing nozzle 9 the velocity is reduced from ultrasonic to subsonic by means of compression shocks. In the following conically divergent subsonic diffuser 11 the gas stream is retarded to a velocity of 20 to 100 m/s, preferably 30 to 80 m/s.

The subsonic diffuser 11 is followed by a shock diffuser 12 and after that by a further shaft 13. In the shock diffuser 12 there is an abrupt expansion of cross-sectional area in the flow direction, the cross-sectional area ratio $q_1/q_2$ being between 0.6 and 0.95.

At least the rear wall 14 of the shaft 13 is curved slightly inwards, so that the shaft cross-sectional area diminishes in the flow direction (cross-sectional contraction 15). This results in an increase of the flow velocity to 50 to 100 m/s. At the bottom end of the curved shaft rear wall 14, a distributor pipe 16 is arranged perpendicular to the drawing nozzle axis. As can be seen from FIG. 2, the distributor pipe 16 is partly integrated by its surface into the rear wall 14. The distributor pipe 16 has a plurality of boreholes 17 in its longitudinal direction, from which gas issues with sonic velocity in the direction of the solids-charged gas stream 10. The gas jets 18 issuing at equal distances over the whole width of the shaft form a gas-dynamical grating, through whose gaps and downwards through a discharge shaft 20 fall the shots 19, while the lighter fibres are entrained by the gas jets 18 and withdrawn through a laterally mounted fibre shaft 21. The gas jets 18 are blown in at an angle $\alpha$ of 15° to 110°, preferably 30° to 90° to the drawing nozzle axis. The deviation of the fibre-charged stream (angle $\beta$) is 60° to 140°, preferably 90° to 120°. The laterally mounted fibre shaft 21 has the same angle of setting $\beta$. This fibre shaft 21 transports the fibre-charged but shot-free stream 22 onwards to a deposition belt 23, on which the fibres are deposited (see FIG. 1). The distance apart A of the boreholes 17 in the distributor pipe or gas pressure chamber 16 should be at least 5 mm and preferably more than 10 mm. The cross-sectional contraction at the shaft outlet is such that the ratio of the shaft inlet cross-sectional area to the outlet cross-sectional area is a maximum of 2:1.

Figure 3:
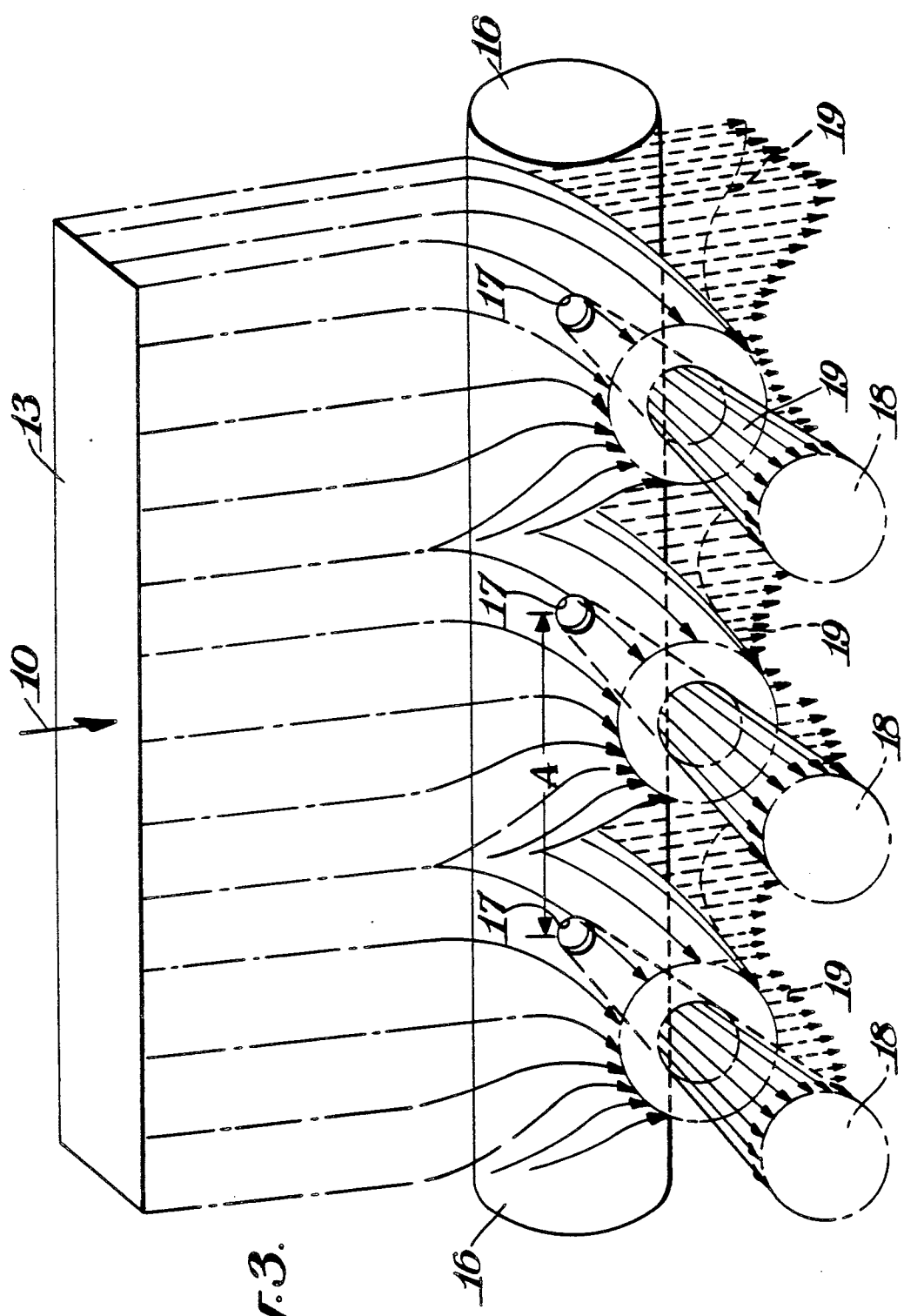
FIG. 3 shows the flow conditions in the shot separating device.

The determining fluid dynamical conditions for shot separation are explained as follows with the aid of FIG. 3. This again shows the rectangular shaft cross-section in which the solids-charged gas stream 10 flows downwards. Arranged transversely to this are the distributor pipe or pressure chamber 16 with the boreholes 17. The flow arrows indicate how the gas jets 18 issuing from the boreholes 17 deviate by their momentum the solids-charged gas stream 10 flowing from above. The shots 19, which cannot be deviated owing to their size, mass and air resistance, continue onwards, to a first approximation in a straight line. With this the separation maximum lies exactly at the middle of the distance apart of the boreholes A. The distance apart A is suitably chosen so that the gas jets do not meet until complete deviation of the gaseous fraction of the stream 10 has occurred.

EXAMPLE

Figure 2:
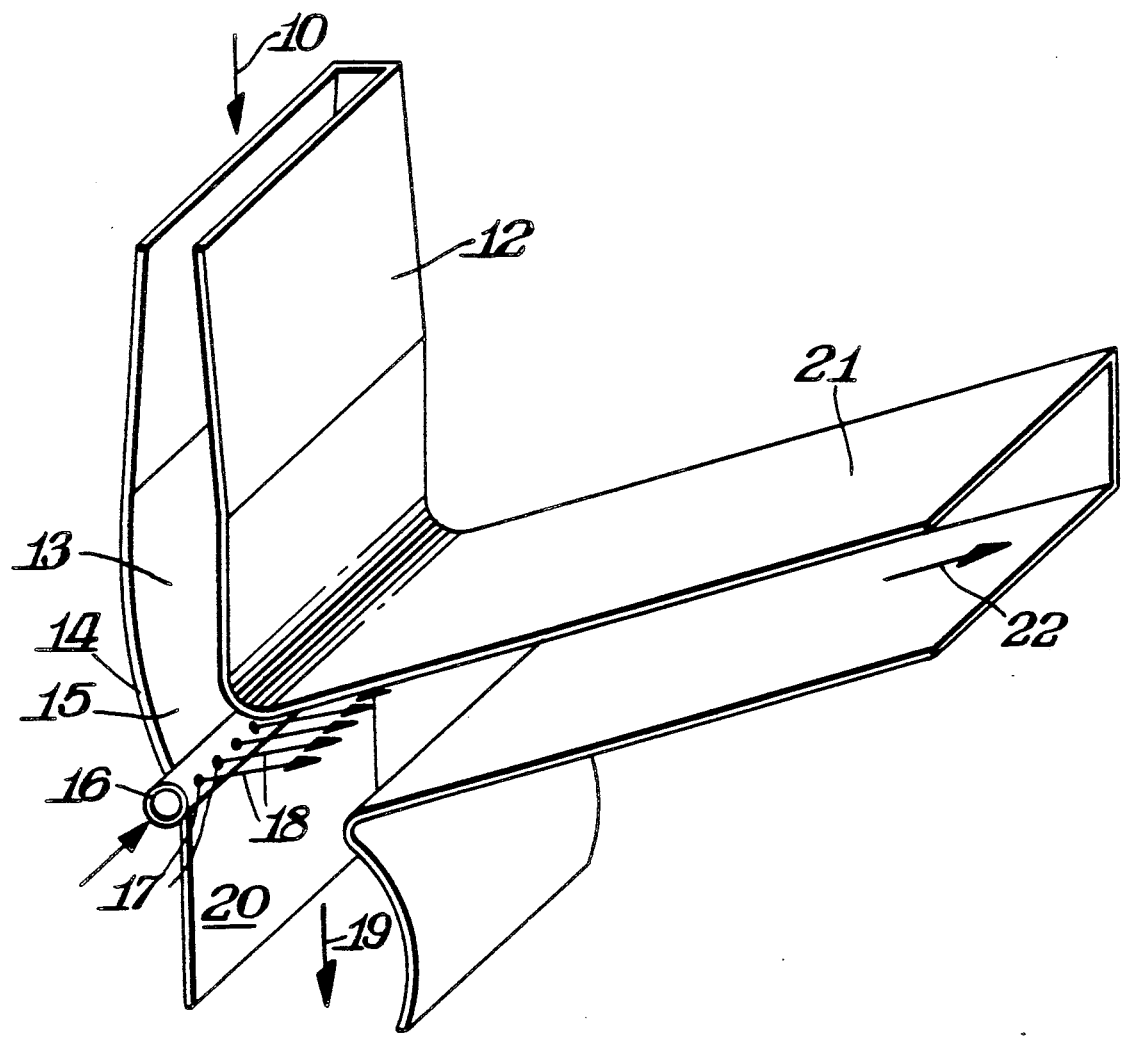
FIG. 2 shows the shot separating device in perspective view.

The shot separation described below was carried out in a drawing nozzle described in EP-A 0 200 071 in conjunction with a shot separator according to FIGS. 1 to 3. At the end of the drawing nozzle 9 the air stream 10, charged with fibres and shots and with a solids content of 0.01 kg/kg air, experiences a compression from supersonic to near-sonic velocity and is then retarded in the subsonic diffuser 11, which has a length of 120 mm, to a velocity of 80 m/s at the end of the diffuser 11. With this velocity, the solids-charged air stream 10 reaches the rectangular cross-section of the shaft 13. The diffuser outlet cross-section was 25×140 mm and the inlet cross-section of the shaft 13 was 40×150 mm. The shaft 13 runs over a distance of 100 mm with a constant cross-section. Following that, the flow cross-section is narrowed to 30×150 mm by the rear wall 14 being curved with a radius of 200 mm (cross-sectional contraction 15). Then, owing to the shock diffuser effect, the flow velocity at the entrance to the region of the shaft with the curved rear wall 14 is ca. 40 to 70 m/s, and in the cross-sectional contraction 15 is 60 to 100 m/s, preferably 80 to 100 m/s. At the bottom of the curved rear wall 14 and transverse to the flow direction a distributor pipe 16 having nine boreholes 17 with a diameter of 2 mm is arranged. From these boreholes 17 issue gas jets 18 at a pressure of 2 to 6 bar, preferably 5 bar (in the distributor pipe 16) and with sonic velocity. As described, the issuing air jets 18 form an aerodynamic rake-shaped grating. This has the result that the fibre-charged air, as depicted by FIG. 3, is deviated into the laterally mounted fibre shaft 21. The fibre shaft 21 is mounted at an angle $\beta = 110°$. The gas jets 18 are blown in at an angle $\beta = 70°$ to the drawing nozzle axis. The cross-sectional area of the fibre shaft 21 must be such that the velocity of the fibre-air stream 22 flowing through it is 50 to 100 m/s. The fibre shaft 21 leads to a deposition belt 23 on which the fibres are deposited in mat form. The non-fibrous constituents (shots) 19 can shoot through between the gas jets 18 because of their greater inertia and arrive in the lower discharge shaft 20. With the process described here, ca. 70% to 80% of all non-fibrous constituents (shots) with a mean diameter of 20 $\mu$m to 40 $\mu$m and 80% to 100% of coarser shots could be separated.

We claim:

1. A process for the production of mineral wool fibres having a diameter of 0.1 $\mu$m to 10 $\mu$m by blast drawing comprising the steps of issuing melt streams from melt discharge openings in the bottom of a melt distributor, reducing the melt streams to fibres in a drawing nozzle, flowing the fibres downstream by a blast medium, reducing the flow velocity of the fibres in a downstream diffuser, carrying a main stream charged with fibres and shots from the diffuser through a rectangular shaft downstream of the diffuser, directing a plurality of gas streams transversely to the main stream at an angle of 30° to 120° to the main stream, issuing the gas streams with sonic velocity from a row of boreholes arranged in a linear manner in a gas pressure chamber to thereby form a gas dynamic grating at the end of the rectangular shaft, entraining the fibres by the gas streams while the shots fall through the gas dynamic grating, collecting a deflected stream of fibres free from shots through a fibre shaft and onto a deposition belt, and arranging the fibre shaft at an angle of 60° to 140° to the main stream.

2. A process as in claim 1 wherein the boreholes are spaced apart at least 5 mm from each other.

3. A process as in claim 2 wherein the boreholes are spaced apart more than 10 mm from each other.

4. A process as in claim 1 wherein the flow velocity of the main stream at the inlet of the rectangular shaft is 20 m/s to 100 m/s, and the flow velocity of the main stream at the transverse gas streams is 50 m/s to 100 m/s.

5. A process as in claim 1 including the step of accelerating the flow of the main stream through the rectangular shaft.

6. A process as in claim 5 wherein the ratio of inlet to outlet cross-sectional area of the rectangular shaft is 1.2:1 to 2:1.

7. A process as in claim 1 including the step of operating the drawing nozzle with a total charge of blast medium of $4 \times 10^{-3}$ to $1 \times 10^{-1}$ kg/kg gas.

8. A process as in claim 7 including the step of leading the main stream through a shock diffuser at the inlet to the rectangular shaft.

* * * * *

UNITED STATES PATENT AND TRADEMARK OFFICE
CERTIFICATE OF CORRECTION

PATENT NO. : 5,125,942

DATED : June 30, 1992

INVENTOR(S) : Nyssen et al

It is certified that error appears in the above-identified patent and that said Letters Patent is hereby corrected as shown below:

In Column 4, line 53, "$\beta$" should read --$\alpha$--.

In Column 6, line 17, (claim 8, line 1( "7" should read -- 1 --.

Signed and Sealed this

Seventh Day of September, 1993

Attest:

BRUCE LEHMAN

Attesting Officer        Commissioner of Patents and Trademarks